Figure 4:
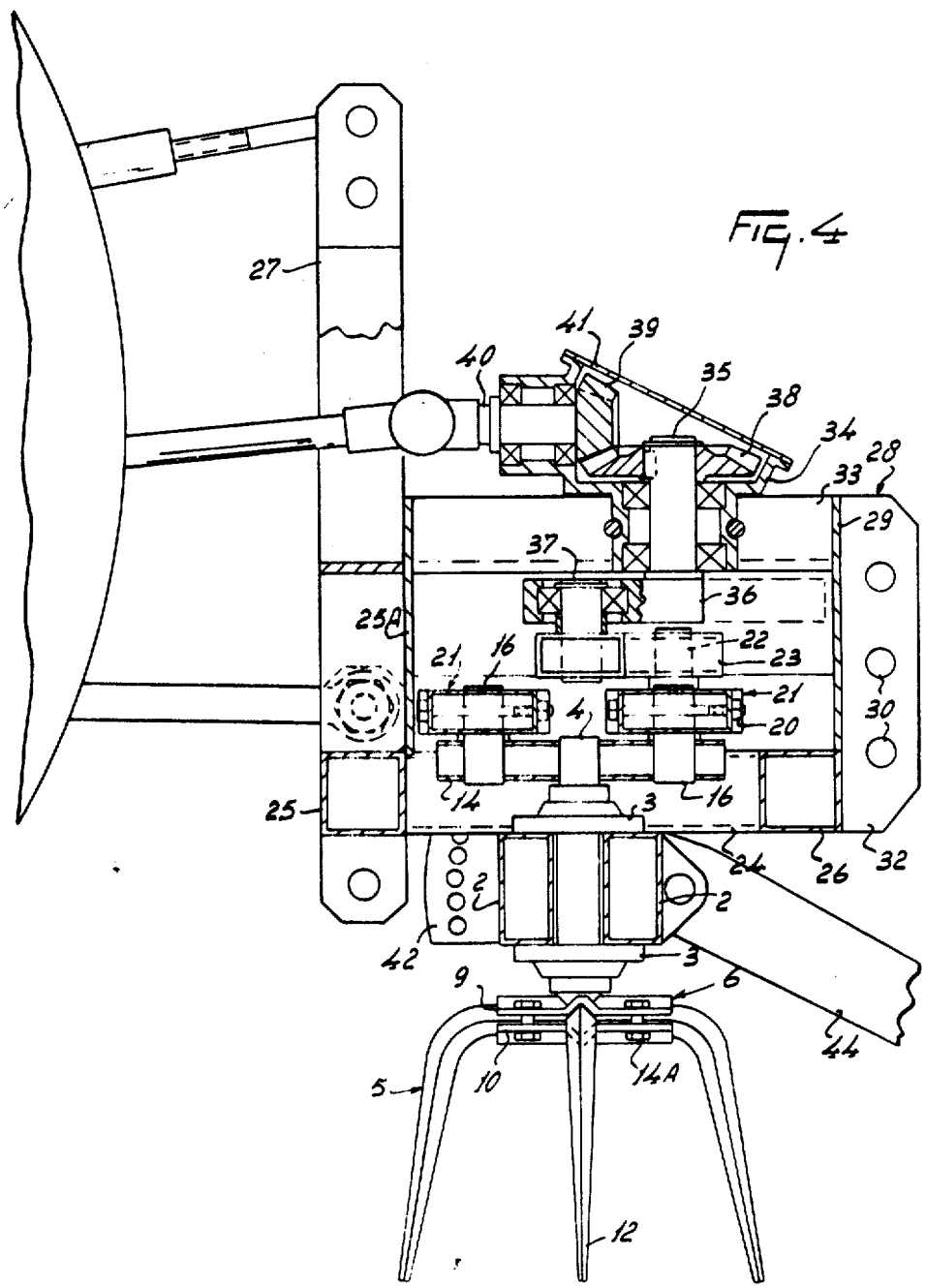

United States Patent [19]
Van Der Lely

[11] 3,887,014
[45] June 3, 1975

[54] SOIL CULTIVATORS
[76] Inventor: Cornelis Van Der Lely, 7 Brüschemrain, Zug, Switzerland
[22] Filed: Sept. 27, 1973
[21] Appl. No.: 401,144

Related U.S. Application Data
[63] Continuation of Ser. No. 144,462, May 7, 1971, abandoned.

[30] Foreign Application Priority Data
May 19, 1970 Netherlands.................. 7007194

[52] U.S. Cl. .................. 172/54; 172/59; 172/110
[51] Int. Cl. ............................................. A01b 33/00
[58] Field of Search ............ 172/59, 110, 111, 125, 172/54, 57, 102, 97

[56] References Cited
UNITED STATES PATENTS
| 75,310 | 3/1868 | Standish............................ 172/59 X |
| 2,722,167 | 11/1955 | Rode.................................. 172/97 X |
| 3,146,832 | 9/1964 | Fry.................................... 172/59 |
| 3,657,785 | 4/1972 | Vissers............................... 172/53 |

FOREIGN PATENTS OR APPLICATIONS
| 1,018,572 | 1/1953 | France............................... 172/110 |
| 1,927,422 | 1/1970 | Germany........................... 172/110 |
| 1,521,864 | 3/1968 | France............................... 172/102 |

Primary Examiner—Edgar S. Burr
Assistant Examiner—R. T. Rader
Attorney, Agent, or Firm—Mason, Mason & Albright

[57] ABSTRACT

A soil cultivator has a beamed frame with a coupling member to be attached to a tractor. A plurality of tined soil working members are mounted side-by-side, to rotate about their respective vertical shafts. An eccentric crank with connecting rods is connected to the shaft of each soil working member journalled in the frame. A gear box has its output side connected to the power takeoff of a tractor so that rotating the crank, oscillates the tines in arcuate paths. The frame has a rear portion with additional coupling members so that other implements can be connected to the frame in trailing relationship. Each soil working member includes a pair of clamping plates recessed to receive the individual tines which can also have adhesive to insure key.

15 Claims, 8 Drawing Figures

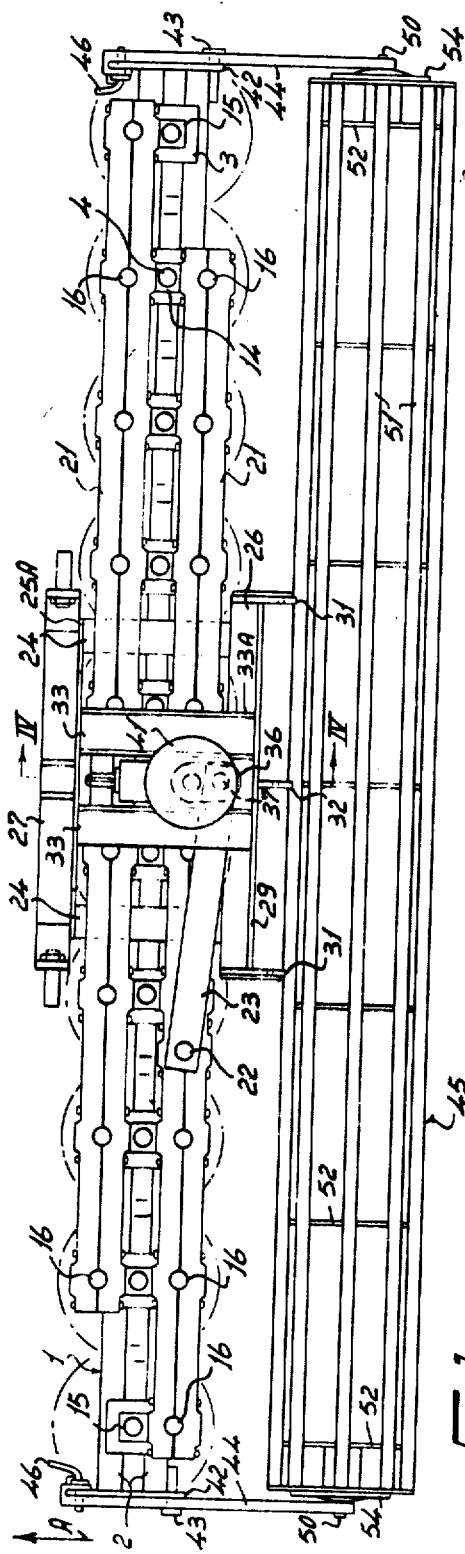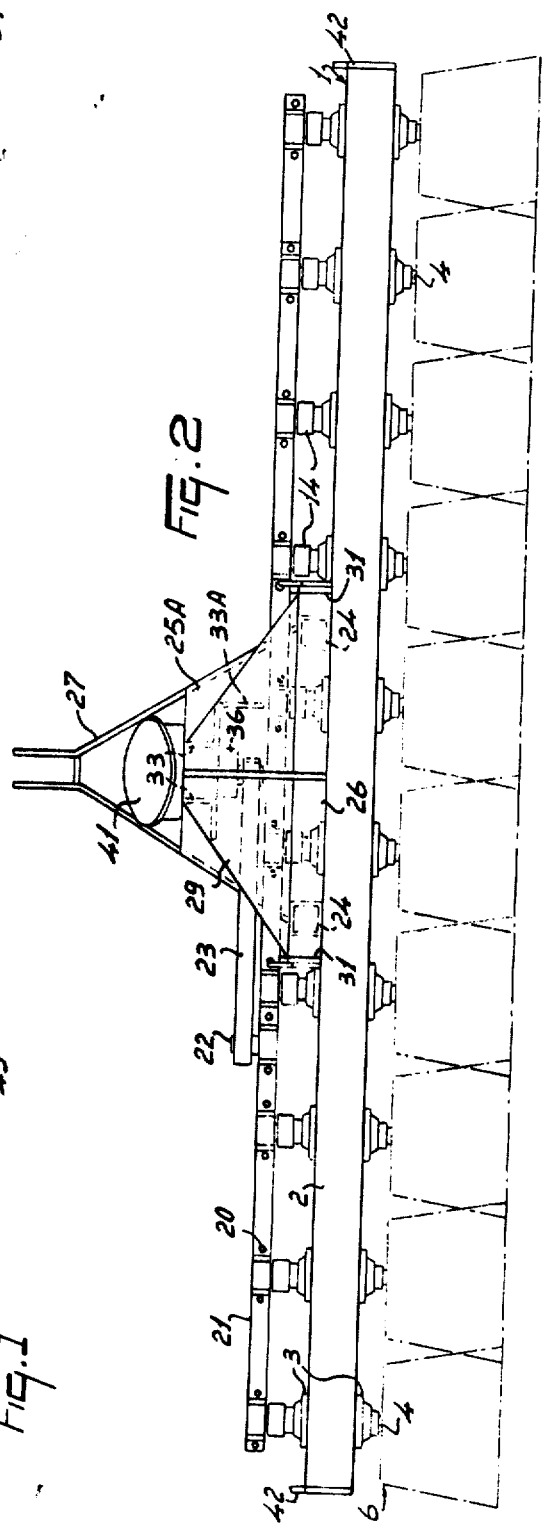

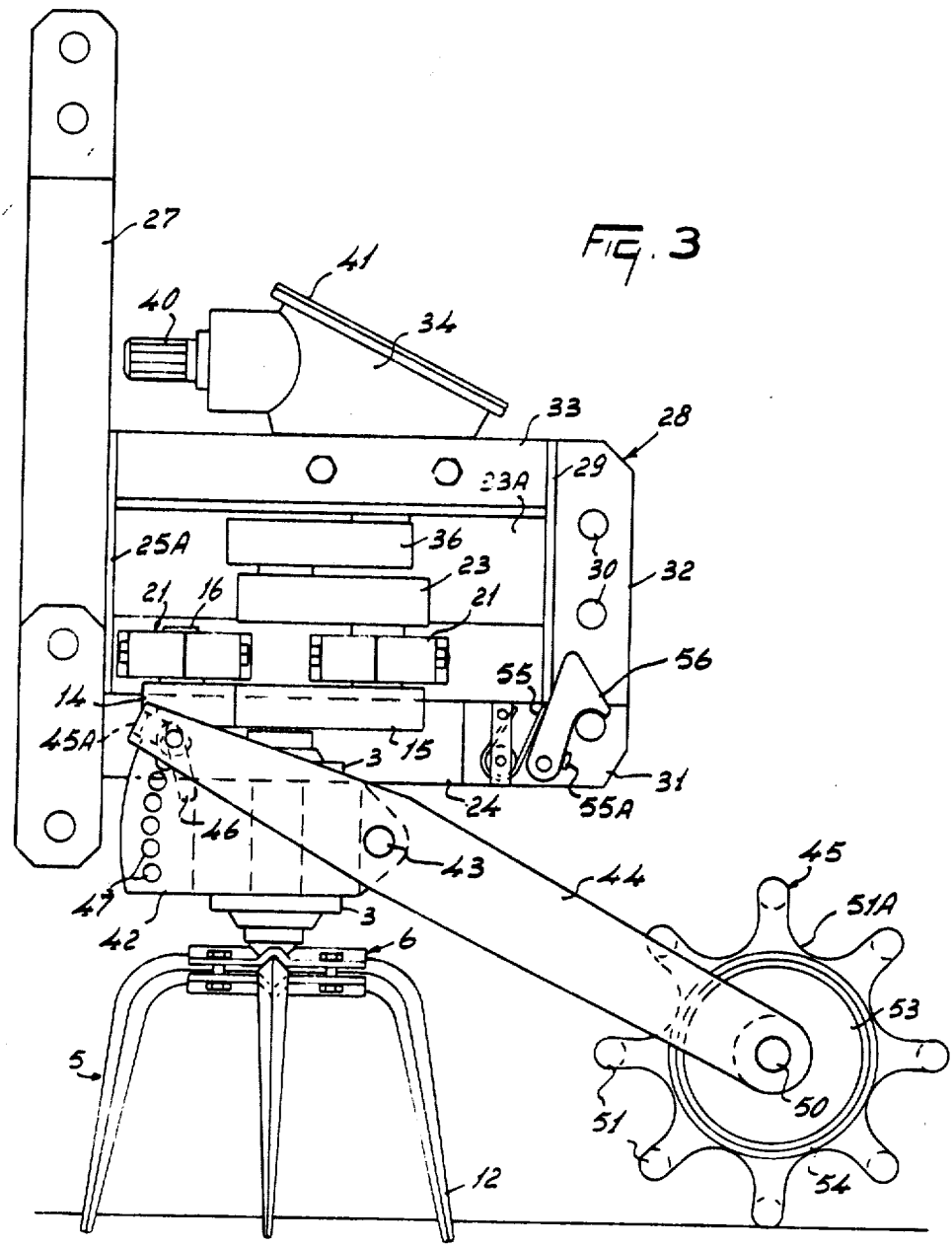

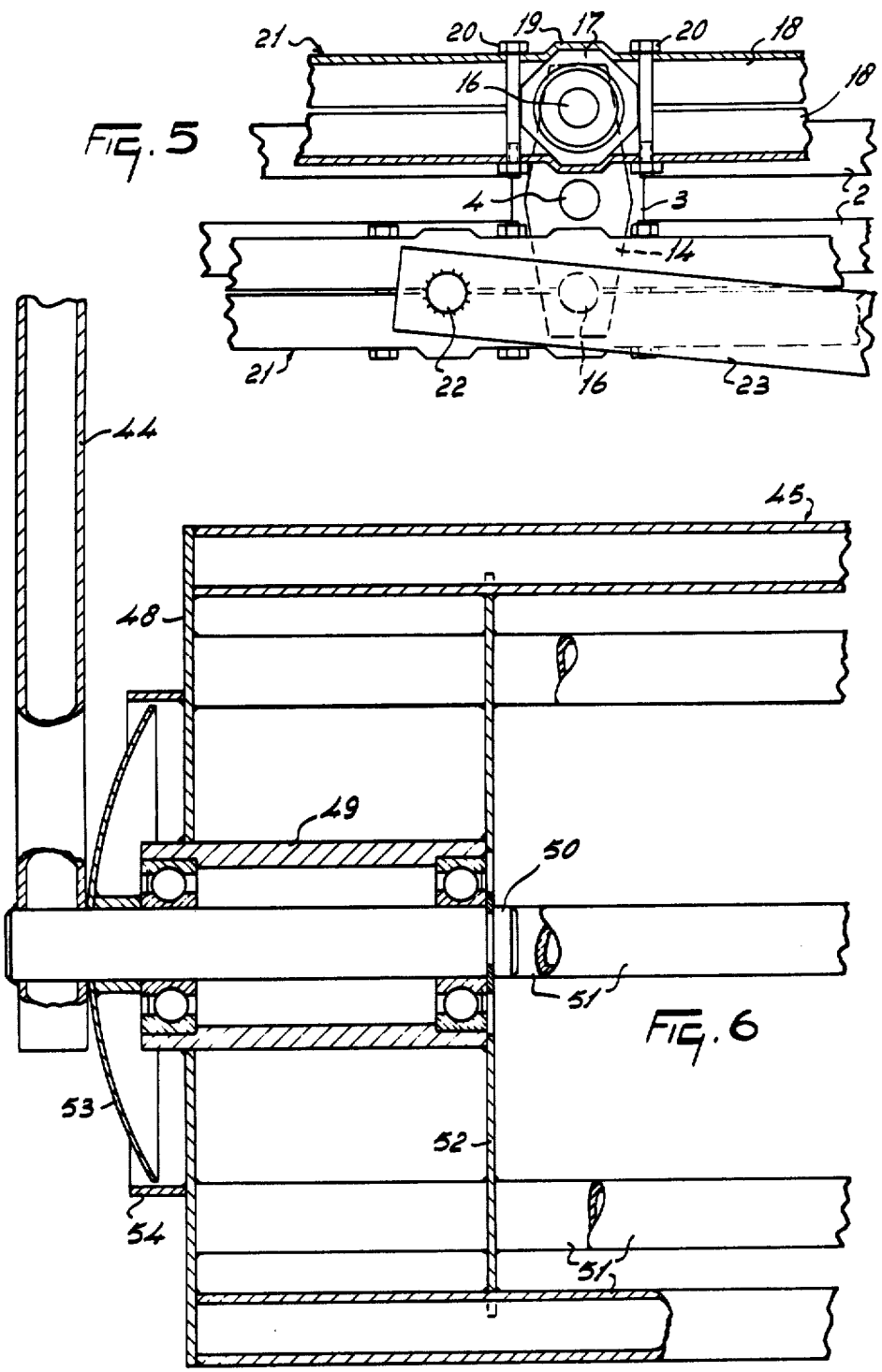

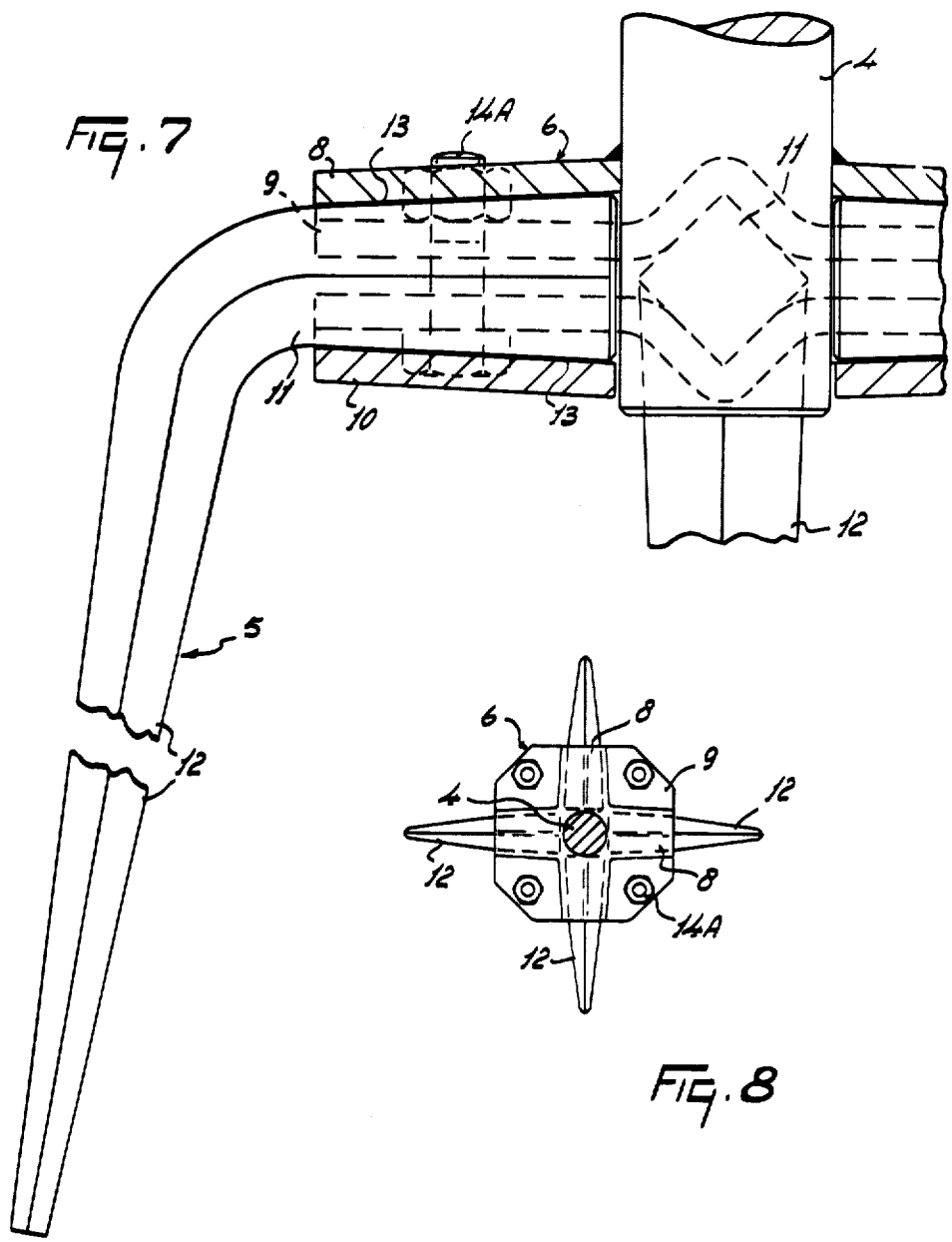

SOIL CULTIVATORS

This is a continuation of application Ser. No. 144,462, filed May 7, 1971, now abandoned.

This invention relates to soil cultivators of the kind comprising a frame and a plurality of tined soil working members that are mounted in the frame so as to be turnable about upright axes relative thereto in such a way that, during operation of the cultivator, at least some of said tines move to and fro through the soil in directions that are transverse to the direction of operative travel of the cultivator at such time.

Known cultivators of this kind suffer from the disadvantages that their tines move in such a way that the soil, particularly heavy soil, is not sufficiently broken up, and that the operating tractors or other vehicles are subject to undesirable vibrations and other shocks when the cultivators are in use. An object of the invention is to overcome, or at least reduce, these disadvantages.

According to the invention, there is provided a soil cultivator of the kind set forth, wherein the soil working members are constructed and arranged in such a way that, during operation of the cultivator, at least some of their tines move to and fro through the soil in directions that are substantially parallel to the direction of operative travel of the cultivator at such time.

For a better understanding of the invention, and to show how the same may be carried into effect, reference will now be made, by way of example, to the accompanying drawings, in which:

FIG. 1 is a plan view of a soil cultivating implement or cultivator in accordance with the invention, FIG. 2 is a rear elevation of the cultivator of FIG. 1 with the omission of a roller that is located at the rear of the implement in the plan view of FIG. 1, FIG. 3 is a side elevation corresponding to FIG. 1 but to an enlarged scale, FIG. 4 is a section, to an enlarged scale, taken on the line IV—IV of FIG. 1, FIG. 5 is a part-sectional view, to an enlarged scale, illustrating details of the drive arrangement to one of the soil-working members of the implement, FIG. 6 is a part-sectional rear elevation, to an enlarged scale, showing the construction and arrangement at one end of the roller of the cultivator in greater detail, FIG. 7 is a part-sectional elevation, to an enlarged scale, illustrating the mounting of tines in one of the soil-working members of the cultivator, and FIG. 8 is a sectional plan view to a reduced scale as compared with FIG. 7 and substantially corresponding to FIG. 7.

Referring to the drawings, the soil cultivating implement or cultivator that is illustrated has a frame generally indicated by the reference numeral 1 which frame comprises two hollow beams 2 that extend substantially horizontally perpendicular to the intended direction of operative travel of the cultivator that is indicated by an arrow A in FIG. 1 of the drawings and that are spaced apart from one another by a short distance considered in the direction A (see FIG. 4 of the drawings). Pairs of upper bearings 3 and pairs of lower bearings 3 (FIG. 4) are secured to the upper and lower surfaces of the hollow beams 2 at regular intervals along the lengths of those beams, said bearings 3 carrying corresponding substantially vertical shafts 4 whose upper and lower ends project respectively above, and below, the upper and lower bearings 3. The portions of the shafts 4 that lie between the upper and lower bearings 3 are disposed between the two hollow beams 2. Each shaft 4 affords the upright axis of oscillation of a corresponding soil working member 6 that is mounted on the lowermost end of that shaft projecting beneath the corresponding lower bearings 3. Each soil working member 6 is afforded principally by four rigid tines 5 and by a holder or support, in the form of upper and lower plates 9 and 10, that receives said tines 5.

The tines 5 are of square, or substantially square, cross-section and the upper and lower support plates 9 and 10 are formed with registering angular grooves 8 (FIGS. 7 and 8) that project radially from the axis of the corresponding shaft 4 to define a cruciform pattern of openings which receive root or fastening portions 11 of the tines 5. The plates 9 and 10 are formed with central apertures through which the lower end of the corresponding shaft 4 is entered and, as can be seen in FIG. 7 of the drawings, the upper plate 9 is welded to the shaft 4 which it surrounds. The root or fastening portions 11 of the four tines 5 of each soil working member 6 extend substantially horizontally in radial directions from the corresponding shafts 4 and are arranged at 90° intervals around the longitudinal axis of said shaft. As previously mentioned, each tine 5 is of square or substantially square cross-section throughout its length and it will be evident from the drawings that the tines taper progressively from their uppermost and radially innermost ends to their lowermost and radially outermost tips. The lower plates 10 are clamped to the upper plates 9 by four substantially vertical bolts 14A and, in order to provide an absolutely rigid construction for each soil working member 6, a layer 13 of epoxy resin adhesive is preferably applied to the root or fastening portions 11 of the tines 5 to fix them immovably in place in the tapering angular grooves 8. The surfaces of the grooves 8 and root or fastening portions 11 of the tines 5 are left quite rough in order to provide a good key for the layer 13 of adhesive. The tines 5 are bent over downwardly beyond the plates 9 and 10 to form tapering soil working portions 12, the four soil working portions 12 of each member 6 diverging gently in a downward direction with respect to one another.

Ten soil working members 6 are arranged in a single row that extends substantially horizontally and substantially perpendicularly transverse to the direction A, the axes of oscillation of the ten soil working members being afforded by the corresponding ten shafts 4. The perpendicular distance between the axes of oscillation of any two neighbouring soil working members 6 of the row is about 30 centimeters but the distance between the tips of the soil working portions 12 of two tines 5 that are opposite to one another in each member 6 is greater than the perpendicular distance mentioned above so that the strips of ground worked by the individual member 6 overlap one another as can be seen best in FIG. 2 of the drawings. The angular settings of the tines 5 around the shafts 4 are, of course, staggered in regard to neighbouring soil working members 6 so that the tines 5 thereof will not foul one another during operation of the cultivator.

All of the shafts 4, with the exception of those corresponding to the two members 6 at the opposite ends of the row, have arms 14 mounted upon them immediately above the upper bearings 3, said arms 14 (FIG. 4) being engaged by their centres with the corresponding shafts 4 and extending substantially parallel to the direction A in the positions thereof that are illustrated in the drawings. The two shafts 4 corresponding to the two soil working members 6 at the opposite ends of the row carry short arms 15 that project respectively forwardly and rearwardly relative to the direction A from those shafts 4 and parallel to the longer arms 14. The short arms 15 are, effectively, half the length of the longer arms 14. The ends of the arms 14 and 15 that are remote from the corresponding shafts 4 carry upright stub shafts 16 which stub shafts are journalled in bearings 17 that are clamped between pairs of oppositely directed beams 18 of channel-shaped cross-section. The webs of the beams 18 are formed with embossed projections 19 (FIG. 5) to receive and locate the various bearings 17 and bolts 20 extend between said webs to clamp the beams 18 to one another around the bearings 17. The pairs of beams 18 afford connecting rods 21 that extend parallel to the hollow frame beams 2.

The connecting rods 21 are of a simple and inexpensive construction and are located at opposite sides of a horizontal line joining all of the shafts 4. They are longitudinally offset relative to one another (i.e. in a horizontal direction perpendicular to the direction A) by a distance equal to the perpendicular spacing between two neighbouring shafts 4 (see FIG. 1 of the drawings). In fact, the leading connecting rod 21, relative to the direction A, is indirectly connected to the shaft 4 of the extreme right-hand soil working member 6 whereas the trailing connecting rod 21, relative to said direction, is indirectly connected to the shaft 4 of the extreme left-hand soil working member 6. The trailing or rear connecting rod 21 is provided between its mid-point and its left-hand end with an additional bearing located between two of the bearings 17 and having the same construction as that of the bearings 17. This additional bearing receives a substantially vertical pivot pin 22 whose upper end is secured to an arm 23 arranged to reciprocate the rear connecting rod 21 during operation of the cultivator.

Beams 24 that both extend parallel to the direction A are secured to the tops of the two beams 2 in spaced apart relationship at equal distances from the midpoints of the two beams 2. The leading and rear ends of the beams 24 are perpendicularly interconnected by hollow beams 25 and 26 of square cross-section. A coupling member or trestle 27 shaped for connection to the three-point lifting device or hitch of an agricultural tractor or other vehicle is secured to the front of the hollow beams 25 and the rear of the hollow beam 26 is provided with a further coupling member 28 that includes a generally triangular plate 29 arranged in a substantially vertical plane with its lowermost edge secured to the rear surface of the beam 26. Vertical strips 31 are mounted at the opposite ends of the beam 26, each strip 31 being formed with a corresponding recess or hole whilst a third vertical strip 32 has its lowermost edge secured to the beam 26 and its leading edge secured to the plate 29. The strip 32 is formed with holes 30 and angular supports 33 extend parallel to the direction A between an upper region of the generally triangular plate 29 and the rear of a further plate 25A that is mounted in a substantially vertical plane immediately behind the coupling member or trestle 27. The angular supports 33 are spaced apart from one another by a distance shorter than that between the two beams 24 but, once again, they are located at equal distances from the midpoints of the two hollow frame beams 2.

A gear box 34 is mounted on the supports 33 and a vertical output shaft 35 (FIG. 4) is rotatably mounted in the gear box 34 in such a way as to project from the bottom of the gear box. A crank 36 has one of its ends secured to the projecting output shaft 35 and this crank has its opposite end pivotally connected by a vertical stub shaft 37 to the end of the aforementioned arm 23 that is remote from the vertical pivot pin 22. The right-hand support 23 (when the cultivator is viewed in the direction A) is provided with a downwardly directed screening plate 33A (FIG. 2) for the crank 36. The uppermost end of the shaft 35 is provided, inside the gear box 34, with a bevel pinion 38 whose teeth are in driven mesh with those of a smaller bevel pinion 39 that is secured to the rearmost end of a forwardly projecting rotary input shaft 40 of the gear box 34. The top of the gear box 34 is provided with a detachable cover plate 41 and it will be seen from FIG. 4 of the drawings that this cover plate 41 is inclined to the horizontal in such a way that the front thereof is at a higher level than the rear thereof. This construction improves the accessibility of the gear box 34.

The ends of the frame beams 2 are provided with vertical plates 42 (FIG. 3) whose leading edges are curved. The rear extremities of the plates 42 are provided with horizontal pivot pins 43 about which corresponding supporting arms 44 are turnable. The rearmost ends of the arms 44 rotatably support a soil compressing member in the form of a roller which roller lies behind the soil working member 6 with respect to the direction A and extends parallel to the frame beams 2. The leading ends 45A of the supporting arms 44 are bent over around the curved edges of the plates 42 and each of them is provided with a horizontal locking pin 46 that can be entered into any selected one of a curved row of holes 47 formed in the corresponding plate 42 alongside the curved edge thereof. It will be evident that the centres of curvature of the rows of holes 47 are coincident with the axis defined by the horizontal pivot pins 43. The holes 47 that are chosen to co-operate with the locking pins 46 determine the relative heights of the frame 1 and the axis of rotation of the roller 45.

The construction of the roller 45 is shown in greater detail in FIG. 6 of the drawings. The ends of the roller 45 are afforded principally by vertically disposed annular plates 48 whose outer peripheries are interconnected at regular intervals by eight horizontally disposed tubes 51. The plates 48 are fastened to horizontal bearings 49 which surround corresponding stub shafts 50 secured to the respective supporting arms 44. The peripheral tubes 51 extend parallel to the frame beams 2 throughout the distance between the plates 48, said plates being formed, between the various tubes 51, with recesses 51A (FIG. 3) designed to prevent the permanent adhesion of sticky soil and other materials. Seven circular plates 52 (FIGS. 1 and 6) are contained in regularly spaced apart vertical planes and have their peripheries connected to the eight tubes 51, the two plates 52 that are closest to the opposite ends of the roller 45 also being secured to the corresponding horizontal bearings 49. Each stub shaft 50 is provided, alongside the corresponding supporting arm 44, with an outwardly convex cap-shaped plate 53 the edge of which is located inside a corresponding ring 54 that projects outwardly from the plate 48 at the end of the roller 45 concerned. The plates 53 and rings 54 co-operate to screen the bearings 49 from damaging contaminants.

Agricultural tools and implements having two- or three-point coupling members can be connected to the rear of the cultivator with the aid of the coupling member 28. To this end, each of the vertical strips 31 is provided with a hook or pawl 56 (FIG. 3) that is turnable about a corresponding horizontal pivot pin. Springs 55 urge the pawls 56 into engagement with stops 55A so that the coupling pins of the tool or implement that is to be connected to the cultivator can be latched into the recesses of the strips 31 by the pawls 56 in the manner that can be seen in FIG. 3 of the drawings. When the tool or implement that is to be connected to the cultivator has a three-point coupling member or hitch, the upper coupling point thereof can be connected by a rod to the upper coupling point of the trestle 27 at the front of the cultivator. When the tool or implement does not have a third coupling point, the holes 30 in the central strip 32 may be employed.

In the use of the cultivator which has been described, the coupling member or trestle 27 is connected to the three-point lifting device or hitch of an agricultural tractor or other operating vehicle and the rotary input shaft 40 of the gear box 34 is placed in driven connection with the power take-off shaft of the same tractor or other operating vehicle by means of an intermediate telescopic transmission shaft of known construction having universal joints at its opposite ends. As the cultivator is moved over the ground in the direction A, all the soil working members 6 of the row are caused to oscillate about the axes of their central shafts 4 as the rotation of the output shaft 35 of the gear box 34 is translated into reciprocation of the rear coupling rod 21 by the crank 36 and the arm 23. The crank mechanism that is afforded by the crank 36, the arm 23 and the connecting rods 21 causes the arms 14 and 15 and the soil working members 6 that are connected thereto to oscillate about the upright axes of the corresponding shafts 4, the connecting rods 21 reciprocating in directions parallel to the frame beams 2. The tines 5 of the soil working members 6 thus move to and fro through the soil along arcuately curved paths and in directions that are both parallel, and transverse, to the direction A. Since each soil working member 6 has four tines 5 arranged in cruciform relationship, and since the strips of land worked by neighbouring members 6 overlap one another, a very intensive crumbling of the soil results. The connections of the tines 5 to the plates 9 and 10 both by clamping action and by a strong adhesive makes the unwanted detachment of tines during operation of the cultivator a very rare occurrence. The soil compressing member that is afforded by the roller 45 can be employed, by turning it to an appropriate angular setting about the pins 43, to govern the working depth of the tines 5 and it will be realized that at least part of the weight of the cultivator can be supported from the ground by the roller 45. It will be noted that the roller 45 does not have a long central shaft to afford its axis of rotation and that this axis is afforded only by the short stub shafts 50 at its opposite ends. This reduces the cost of the roller and leaves an empty space in its interior so that any adhering soil or other material can readily be dislodged.

The construction of the cultivator which has been described is such that, when its trestle 27 is connected to the three-point lifting device or hitch of a tractor or other vehicle, the soil working members 6 are located at only a very short distance behind that tractor or other vehicle. The arrangement is, in fact, such that the rearmost tines of the members 6 are spaced behind a vertical plane containing the coupling points of the trestle 27 (and thus the co-operating coupling points of the tractor or other operating vehicle) by a distance which is not more than twice the length of the soil working portion 12 of any tine 5, said distance preferably being less than one unit of the length which has just been mentioned, i.e. preferably less than 25 centimetres. The advantage of this construction is that the further coupling member 28 can be employed for the connection of heavy tools or implements without an excessive load being placed upon the three-point lifting device or hitch of the operating tractor or other vehicle. It is not, of course, essential that each soil working member 6 should have four tines and a lesser, or greater, number thereof may be provided if desired.

Whilst various features of the cultivator that has been described, and that is illustrated in the drawings, will be set forth in the following claims as inventive features, it is to be noted that the invention is not necessarily limited to these features and that is encompasses all of the features that have been described and illustrated both individually and in various combinations.

What we claim is:

1. A soil cultivator attachment comprising a movable frame and a plurality of soil-working members with downwardly extending tines supported on said frame, said soil-working members being positioned side-by-side in a single row that extends transverse to the direction of travel, each soil-working member comprising a support rotatably mounted on an upwardly extending shaft and each of said tines being mounted on its corresponding support, driving means interconnecting the upwardly extending shafts of said soil-working members, said driving means including eccentric means mounted on said attachment and a horizontally extending driving rod means, said driving rod means being in driving connection with each of said shafts to rotate the same and oscillate said soil-working members and tines to and fro through the soil, the upper ends of said shafts being supported and journalled in said cultivator attachment, said tines being offset with respect to their corresponding upwardly extending shafts, said offset being such that adjacent soil-working members work overlapping paths when oscillated, said frame having attachment means at the forward end thereof for coupling to a prime mover.

2. A cultivator attachment as claimed in claim 1, wherein said driving rod means extends transverse to the direction of travel and substantially parallel to said single row.

3. A cultivator as claimed in claim 2, wherein there are a plurality of spaced apart tines on each of said supports.

4. A cultivator as claimed in claim 2, whereby said eccentric means is a device that is substantially centrally mounted on said cultivator.

5. The cultivator attachment of claim 1, wherein said eccentric device is in driving connection with a bevel pinion transmission which has an imput shaft connectable to the power take off.

6. A soil cultivator attachment comprising a movable frame and a plurality of soil-working members supported on said frame, side-by-side in a row that extends transverse to the direction of travel, each soil-working member comprising a support rotatably mounted on an upwardly extending shaft and having downwardly extending tines, driving means interconnecting the shafts of said soil-working members and said driving means including an eccentric device mounted on said attachment with a driven, horizontally extending arm means and said arm means being in driving connection with each of said shafts to oscillate the tines and said soil-working members to and fro, through the soil, said frame having attachment means at the forward end thereof for coupling to a prime mover, a rotatable elongated supporting roller being positioned to the rear of said row of soil-working members and adjacent same, arms pivotally connecting said roller to said frame and said roller having a plurality of peripheral elements that extend generally horizontal on said roller.

7. A cultivator as claimed in claim 6, wherein each upwardly extending shaft on which a soil-working member is mounted, is secured to a respective arm and said driven arm means is a reciprocating arm that is coupled to connecting rod means, said connecting rod means being connected to the responsive arms and to said reciprocating arm.

8. A cultivator as claimed in claim 7, wherein said connecting rod means includes two spaced apart connecting rods which are pivotally connected to one another through the respective arms secured to said upwardly extending shafts.

9. A cultivator as claimed in claim 8, wherein said connecting rods are located at relatively opposite sides of a line interconnecting said upright shafts.

10. A cultivator as claimed in claim 8, wherein at least one connecting rod is interconnected with a rotary crank of said eccentric device.

11. A cultivator as claimed in claim 8, wherein each connecting rod is comprised of two beams clamped to one another and bearings are positioned between said clamped beams to pivotally secure vertical stub shafts on the respective arms.

12. A cultivator as claimed in claim 11, wherein said beams are channel-shaped in cross-section, and formed with registering projections to house said bearings.

13. A soil cultivator attachment comprising a movable frame and a plurality of soil-working members supported on said frame side-by-side in a row that extends transverse to the direction of travel, each soil-working member being rotatably mounted on an upwardly extending shaft and having downwardly extending tines, each of said shafts being secured to a rockable arm, driving means interconnecting the rockable arms and said driving means including connecting rod means in driving engagement with a horizontal arm that extends transverse to the direction of travel, an eccentric device mounted on said attachment being pivoted to move said connecting rod means to and fro and oscillate the tines of said soil-working members through the soil, said frame having attachment means at the forward end thereof for coupling to a prime mover.

14. The cultivator attachment of claim 13, wherein said connecting rod means includes a forward connectng rod spaced apart from a rearward connecting rod and the ends of the rockable arms are pivoted to the forward and rearward connecting rods.

15. The cultivator attachment of claim 13, wherein said soil-working member comprises a generally horizontal support with depending tines.

* * * * *